(12) United States Patent
Imhof et al.

(10) Patent No.: US 10,465,617 B2
(45) Date of Patent: Nov. 5, 2019

(54) DUAL-FUEL INTERNAL COMBUSTION ENGINE

(71) Applicant: GE Jenbacher GmbH & Co OG, Jenbach (AT)

(72) Inventors: Dino Imhof, Baden (CH); Georg Tinschmann, Schwaz (AT)

(73) Assignee: GE Global Sourcing LLC, Norwalk, CT (US)

( * ) Notice: Subject to any disclaimer, the term of this patent is extended or adjusted under 35 U.S.C. 154(b) by 0 days.

(21) Appl. No.: 15/736,332

(22) PCT Filed: Jun. 17, 2016

(86) PCT No.: PCT/AT2016/050212
§ 371 (c)(1),
(2) Date: Dec. 14, 2017

(87) PCT Pub. No.: WO2016/205843
PCT Pub. Date: Dec. 29, 2016

(65) Prior Publication Data
US 2018/0320608 A1  Nov. 8, 2018

(30) Foreign Application Priority Data
Jun. 23, 2015 (AT) .................. A 399/2015

(51) Int. Cl.
*F02D 19/10* (2006.01)
*F02D 19/06* (2006.01)

(52) U.S. Cl.
CPC ......... *F02D 19/105* (2013.01); *F02D 19/061* (2013.01); *F02D 19/0689* (2013.01); *Y02T 10/36* (2013.01)

(58) Field of Classification Search
CPC ............. F02D 41/0025; F02D 41/0027; F02D 19/0647; F02D 19/0642; F02D 41/401
See application file for complete search history.

(56) References Cited

U.S. PATENT DOCUMENTS 2,767,691 A    10/1956  Mengelkamp et al.
5,365,902 A *  11/1994  Hsu .......................... F02B 7/02
                                                    123/299
(Continued)

FOREIGN PATENT DOCUMENTS

CA      2698342 A1    6/2010
DE    602 16 437 T2   9/2007
(Continued)

OTHER PUBLICATIONS

Imhof, D., et al., Dual Fuel combustion control and fast transient response, GE co-pending Application No. AT 530/2015, filed on Aug. 13, 2015.
(Continued)

*Primary Examiner* — Long T Tran
(74) *Attorney, Agent, or Firm* — McCoy Russell LLP

(57) ABSTRACT

A dual-fuel internal combustion engine including a regulating device for regulating the internal combustion engine, at least one piston-cylinder unit, at least one fuel injector for a gaseous fuel, which is assigned to this piston-cylinder unit, at least one gas supply device for gaseous fuel, which is assigned to this piston-cylinder unit, whereby the regulating device has a pilot operating mode in which the liquid fuel is introduced as a pilot fuel, whereby the regulating device in pilot operating mode has a transient mode in which, in an expansion phase of the piston-cylinder unit, the piston-cylinder unit is supplied with liquid fuel by the fuel injector.

18 Claims, 2 Drawing Sheets

(56) References Cited

U.S. PATENT DOCUMENTS

| | | | | |
|---|---|---|---|---|
| 6,422,004 B1* | 7/2002 | Takami | ............... | F01N 3/0842 60/285 |
| 7,305,972 B2 | 12/2007 | Kloos et al. | | |
| 7,769,530 B2 | 8/2010 | Hehle et al. | | |
| 2002/0007816 A1* | 1/2002 | Zur Loye | ............... | F02B 1/04 123/295 |
| 2003/0024246 A1* | 2/2003 | Beck | ............... | F02B 1/12 60/599 |
| 2003/0116133 A1* | 6/2003 | Hertweck | ............... | F02B 1/12 123/431 |
| 2005/0039444 A1* | 2/2005 | Nishizawa | ............ | F02D 41/027 60/285 |
| 2005/0279321 A1* | 12/2005 | Crawford | ............ | F02B 23/0657 123/260 |
| 2010/0229838 A1* | 9/2010 | Sturman | ............... | F01L 1/28 123/525 |
| 2010/0318284 A1* | 12/2010 | Surnilla | ............... | F02B 17/005 701/113 |
| 2011/0023467 A1* | 2/2011 | Kong | ............... | F02D 41/029 60/287 |
| 2012/0272935 A1* | 11/2012 | Magnusson | ............ | F02D 19/081 123/299 |
| 2012/0325180 A1 | 12/2012 | Montgomery | | |
| 2013/0019588 A1* | 1/2013 | Richardson | ............ | F01N 3/106 60/274 |
| 2014/0076291 A1* | 3/2014 | Wong | ............... | F02D 19/0647 123/568.11 |
| 2014/0331970 A1* | 11/2014 | Bidner | ............... | F02D 19/0642 123/435 |
| 2015/0075487 A1* | 3/2015 | Glugla | ............... | F02D 41/405 123/299 |
| 2015/0101563 A1* | 4/2015 | Wong | ............... | F02D 23/00 123/27 GE |
| 2015/0219027 A1* | 8/2015 | zur Loye | ............ | F02D 41/0027 60/603 |
| 2015/0240738 A1* | 8/2015 | Yerace | ............... | F02B 3/08 123/27 GE |
| 2015/0308362 A1* | 10/2015 | Dunn | ............... | F02D 41/3094 123/300 |
| 2015/0308366 A1* | 10/2015 | Melnyk | ............... | F02D 41/1454 123/299 |
| 2015/0315957 A1* | 11/2015 | Bergin | ............... | F02B 23/0651 123/295 |

FOREIGN PATENT DOCUMENTS

| | | |
|---|---|---|
| DE | 10 2014 000 326 A1 | 7/2014 |
| DE | 10 2014 004 976 A1 | 10/2014 |
| EP | 1 730 394 B1 | 7/2011 |
| EP | 2 562 399 A1 | 2/2013 |
| EP | 2 806 140 A1 | 11/2014 |
| WO | 01/59280 A1 | 8/2001 |
| WO | 03/027473 A1 | 4/2003 |
| WO | 2012080568 A2 | 6/2012 |

OTHER PUBLICATIONS

Office Action and Search issued in connection with corresponding AT Application No. A399/2015 dated May 27, 2016.

International Preliminary Report on Patentability issued in connection with corresponding PCT Application No. PCT/AT2016/050212 dated Dec. 26, 2017.

\* cited by examiner

DUAL-FUEL INTERNAL COMBUSTION ENGINE

BACKGROUND OF THE INVENTION

Embodiments of the invention relate to a dual-fuel internal combustion engine with the features of the preamble of claim 1 and a method for operating a dual-fuel internal combustion engine with the features of the preamble of claim 7.

Dual-fuel internal combustion engines are typically operated in two operating modes. We differentiate an operating mode with a primary liquid fuel supply ("liquid operation" for short; in the case of the use of diesel as a liquid fuel, it is called "diesel operation") and an operating mode with primarily gaseous fuel supply, in which the liquid fuel serves as a pilot fuel for initiating combustion (also called "pilot operation", "dual-fuel operation" or "ignition-jet operation").

In pilot operation mode, in which the liquid fuel is introduced as a pilot fuel, the regulating device is designed to control the fuel injector and the at least one gas supply device for selective metering of the quantity of liquid or gaseous fuel supplied to the at least one piston-cylinder unit.

In diesel operation, it is known that the combustion process can be moderated by varying the pilot injections, main injections and after-injections. Such operating modes with multiple injections are known e.g. from DE 602 16 437 T2, EP 2 806 140 A1, US 2012/0325180 or WO 2003/027473 A1.

U.S. Pat. Nos. 7,305,972, 7,769,530, DE 10 2014 000 326 A1, DE 10 2014 004 976 A1 and EP 1 730 394 disclose injectors and control concepts suitable for this purpose.

With regard to the load requirement placed on an internal combustion engine, a distinction can be made between steady-state operation and transient phases.

If the load requirement moves within a relatively narrow band (e.g. if changes in the load requirement are below about 10% of the current load), this is called steady-state operation.

If there are larger changes in the load requirement, the transition from the former to the new load requirement is called a transient phase.

In diesel operation of the internal combustion engine, it is possible to map rapid changes in the load requirement and the internal combustion engine thus has favorable behavior in the transient phase (in short: transient behavior).

In diesel operation, the power is adjusted by adjusting the fuel quantity (fuel-guided system).

If, however, the internal combustion engine is primarily supplied with gaseous fuel, rapid adaptation of the power output of the internal combustion engine to changed load requirements is not possible. Simply supplying more gaseous fuel is ruled out, since the internal combustion engine then starts knocking. An internal combustion engine in pilot operation therefore has an unfavorable transient behavior.

BRIEF DESCRIPTION OF THE INVENTION

The object of embodiments of the invention is therefore to provide a dual-fuel internal combustion engine or a method for operating a dual-fuel internal combustion engine with improved transient behavior.

This object is achieved by a dual-fuel internal combustion engine with the features of claim 1 and a method for operating a dual-fuel internal combustion engine with the features of claim 7. Developments are indicated in the dependent claims.

By the regulating device in pilot operating mode having an operating mode in which liquid fuel is supplied in an expansion phase to the piston-cylinder unit by the fuel injector of the piston-cylinder unit, improved transient behavior of the internal combustion engine is achieved. Thus, the internal combustion engine can continue to be operated in the operating mode with predominantly gaseous fuel, i.e. it does not have to be switched to diesel operation, as is the case in the prior art for creating fast transients.

Especially in so-called fast runners (internal combustion engines with speeds >approx. 1,200 rpm-1) with a central gas mixer, only due to the transport delay through the large paths, it is not possible to change between the operating modes quickly.

Embodiments of the invention make it possible to operate dual-fuel internal combustion engines in the operating mode with a primary supply of gaseous fuel with a transient behavior which comes close to that of diesel engines or dual-fuel internal combustion engines in diesel operation.

The transient behavior thus obtained is clearly superior to that of a conventional gas engine (gas Otto internal combustion engine without the possibility of injection of liquid fuel), with the emission advantages over a diesel engine or a dual-fuel internal combustion engine in diesel operation.

Embodiments of the invention are particularly relevant for use with stationary internal combustion engines and in marine applications. The internal combustion engines can be used as mechanical drives, e.g. for operating compressor systems or coupled with a generator to gensets.

The regulating device is designed such that it remains in the steady-state operating mode in pilot operating mode until the load requirement is changed in terms of quantity over a predetermined threshold value (e.g. more than 10% of the previous or current load requirement). If the threshold value is exceeded, the regulating device switches to transient mode until the power provided by the internal combustion engine falls below a predetermined distance (e.g. less than 10% of the new load requirement) with respect to the new load requirement. As soon as this is the case, the regulating device switches back to steady-state operating mode. Of course, the bands resulting from the above-defined thresholds may be selected depending on the quantity of the current or new load requirement.

BRIEF DESCRIPTION OF THE DRAWINGS

Embodiments of the invention are explained in more detail with reference to the figures. The drawings in detail.

DETAILED DESCRIPTION

Figure 1:
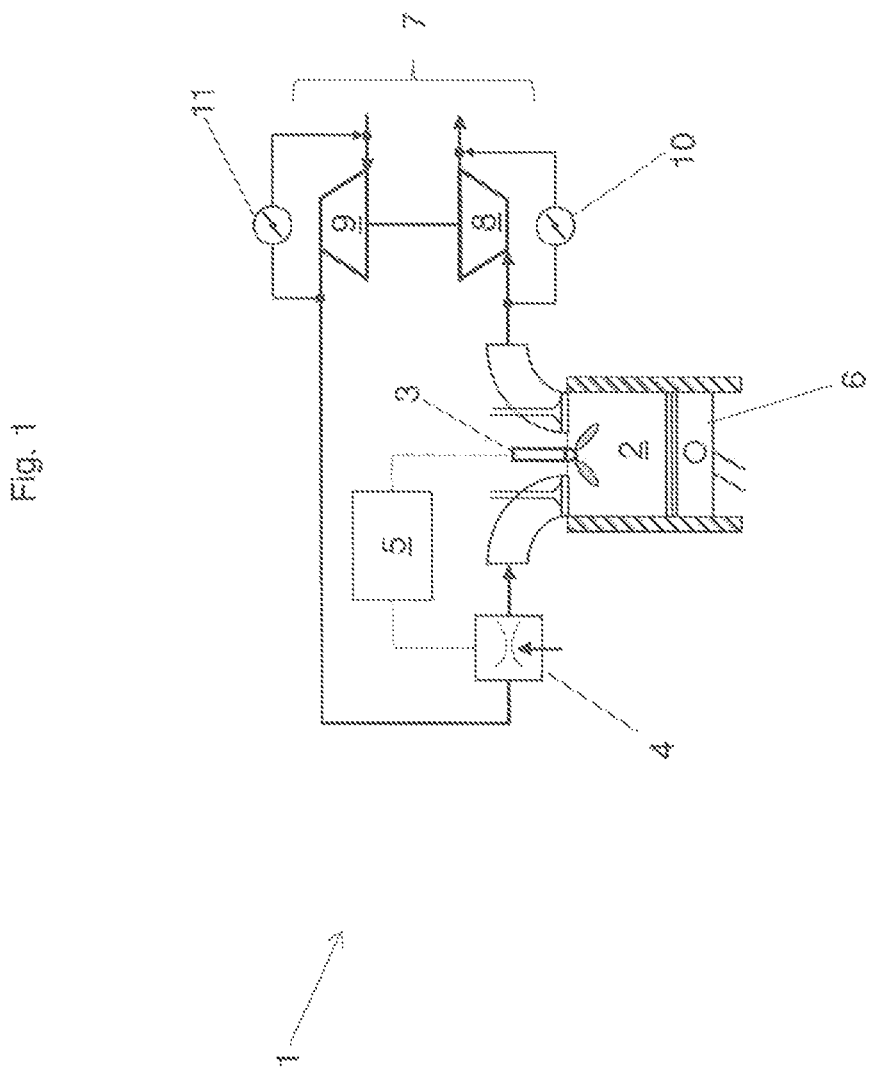
FIG. 1 shows a diagram of an internal combustion engine.

FIG. 1 shows schematically an internal combustion engine 1 with a piston-cylinder unit 2 and a fuel injector 3 for injecting liquid fuel. Only one piston-cylinder unit 2 is shown by way of example. In practice, generic internal combustion engines have a plurality of piston-cylinder units 2.

A regulating device 5 can regulate the quantity of liquid fuel supplied to the piston-cylinder unit 2 (via the fuel injector 3) or the supplied quantity of gaseous fuel (via a gas supply device 4). Signal lines are indicated by dashed lines. In the interest of clarity, not all signal lines leading to the regulating device 5 are shown.

Exhaust gases from the piston-cylinder unit 2 flow to an exhaust-gas turbine 8 of a turbocharger 7. A compressor 9 is connected to the exhaust-gas turbine 8. In the exemplary embodiment shown, a gas supply device 4 is arranged downstream of the compressor 9. At this point, the gas supply device 4 may be designed e.g. as a port-injection valve for the cylinder-specific metering of gaseous fuel.

In one variant, the gas supply device 4 is arranged upstream of the compressor 9. At this point, the gas supply device 4 may be designed e.g. as a gas mixer.

The internal combustion engine 1 or the regulating device 5 is configured such that, in the expansion stroke (expansion phase) of the piston-cylinder unit 2, additional liquid fuel can be injected by the fuel injector 3.

In this phase, the piston 6 of the piston-cylinder unit 2 is already beyond the top dead center and the risk of knocking is thus greatly reduced.

In practice, the safe distance (how early the injection may occur after the top dead center) to the knock limit is determined by experiments. The safe distance depending on the load can be stored e.g. as a look-up table in the regulating device.

The distance to the knock limit also depends on the quality of the gas used as the gaseous fuel. In particular in marine applications, the gas quality can change due to demixing in the entrained gas. A routine may be provided to determine the distance to the knock limit.

The additional introduction of energy in transient mode in the form of liquid fuel in the expansion phase also causes, in addition to a higher power delivery (and thus directly increased torque), increases the enthalpy of the exhaust gas by extending the pressure phase in the piston-cylinder unit 2. Thus, more energy reaches the exhaust-gas turbine 8 of the turbocharger 7, and the compression power of the turbocharger 7 increases faster, which in turn allows a gas supply to follow faster.

An optionally higher fuel consumption and reduced efficiency when driving through the transient phase is accepted.

By injecting the liquid fuel in the expansion phase, only a small increase in NOx emissions can be observed since, in this period, there are temperature and pressure conditions in which barely any NOx is formed.

Embodiments of the invention are particularly suitable for a lean operation with a combustion air ratio lambda of e.g. 1.7 to 1.8. Even after combustion of a lean mixture with high excess air, a sufficiently high content of oxygen for oxidation of the liquid fuel is present. This residual oxygen content is also the limiting factor for the quantity of additionally injected liquid fuel.

As an additional measure, the residual oxygen content in the at least one piston-cylinder unit 2 can be increased in the short term by a wastegate 10 that can be actuated by the regulating device 5, whereby the quantity of liquid fuel that can be converted in transient mode can be increased. Instead of a wastegate 10, a compressor bypass 11 that can be actuated by the regulating device 5 could also be provided for this purpose. Actuation here means a change in the position of the wastegate 10 or compressor bypass 11 in the direction of a smaller opening. A reduced opening position increases the lambda in the short term.

Figure 2A:
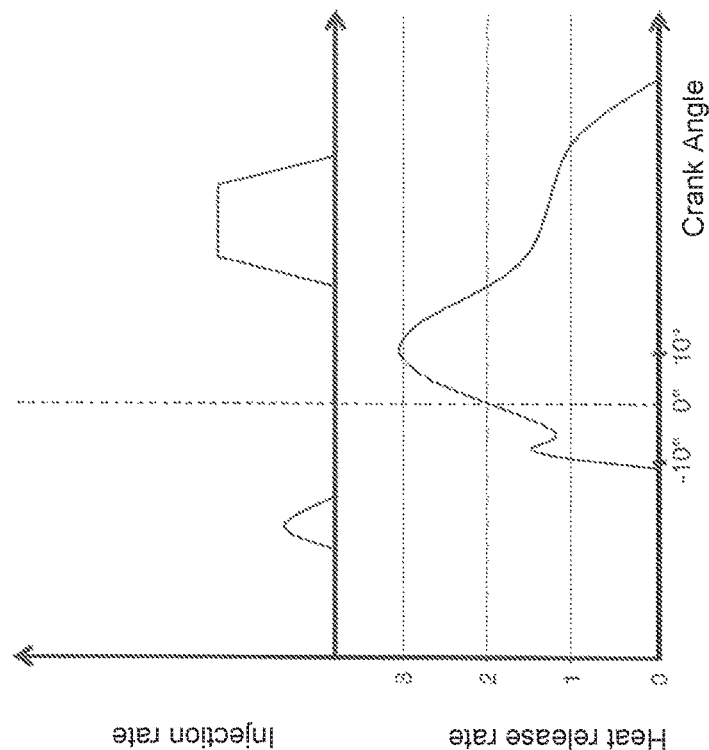
FIG. 2A, 2B show diagrams of an injection rate and a heat release rate over the crank angle in steady-state operating mode (FIG. 2A) and in transient mode (FIG. 2B)

FIG. 2A shows an injection rate and a heat release rate plotted against the crank angle for the steady-state operating mode. The top dead center at 0° crank angle is marked by a dashed vertical auxiliary line. The peak detectable in the course of the injection rate marks the pilot injection.

Figure 2B:
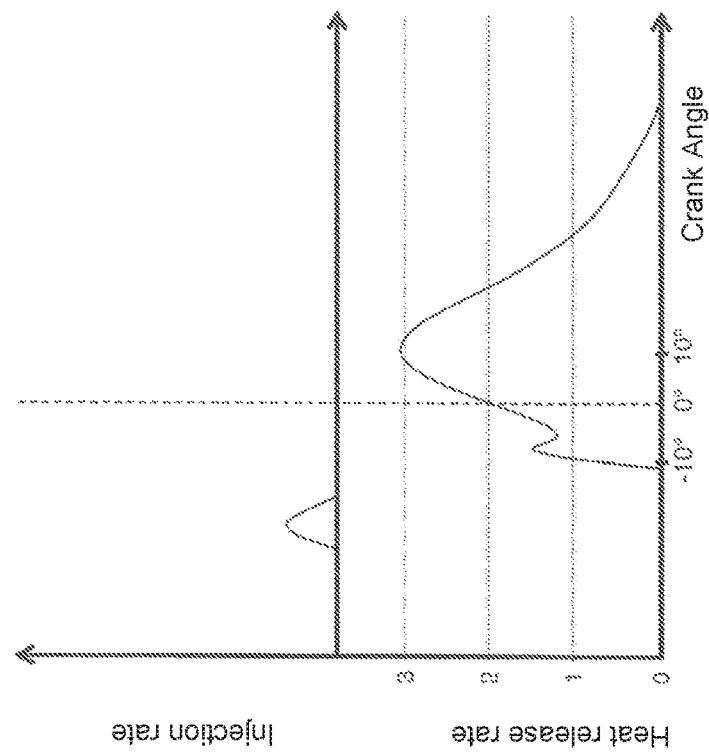

FIG. 2B shows the injection rate and the resulting heat release rate over the crank angle according to embodiments of the invention in transient mode. In the course of the injection rate, in addition to the peak of the pilot injection, the injection in the expansion phase can also be seen. It can be seen that, as a result of this additional injection of liquid fuel in the expansion phase compared with the pilot injection, the course of the heat release rate drops less than in the case described in FIG. 2A.

The area under the heat release rate curve can be interpreted as converted heat. It is clear that significantly more energy is converted by the inventive measure of the additional injection in the expansion phase of the internal combustion engine 1 in dual-fuel operation with gas as the main fuel, which contributes to a faster response of the turbocharger 7 as stated above.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dual-fuel internal combustion engine, comprising:
a regulating device for regulating the internal combustion engine,
a piston-cylinder unit,
a fuel injector for a diesel fuel, coupled to the piston-cylinder unit, and
a gas supply device for gaseous fuel, coupled to the piston-cylinder unit,
wherein the regulating device has a pilot operating mode in which the diesel fuel is introduced as a pilot fuel injection by the fuel injector to initiate combustion of gaseous fuel supplied to the piston-cylinder unit by the gas supply device, wherein the regulating device in the pilot operating mode has a transient mode in which, in an expansion phase of the piston-cylinder unit, the piston-cylinder unit is also supplied with an expansion phase injection of the diesel fuel by the fuel injector while heat is released from the combustion of the gaseous fuel, wherein the expansion phase injection occurs after peak heat release.

2. The internal combustion engine according to claim 1 wherein, in the pilot operating mode, the regulating device is configured to switch from a steady-state operating mode to the transient mode when a current load requirement changes beyond an absolute threshold value.

3. The internal combustion engine according to claim 2 wherein, in the pilot operating mode, the regulating device is configured to switch from the transient mode to the steady-state operating mode when approaching a new load requirement up to a predetermined distance.

4. The internal combustion engine according to claim 1, wherein the internal combustion engine is operated in lean operation with the gaseous fuel and the diesel fuel of the pilot fuel injection providing a combustion air ratio lambda of 1.7 to 1.8.

5. The internal combustion engine according to claim 1, wherein the internal combustion engine is coupled to a stationary platform.

6. The internal combustion engine according to claim 1, wherein the internal combustion engine is in a marine vehicle.

7. A method for operating a dual-fuel internal combustion engine, comprising:
supplying gaseous fuel to a piston-cylinder unit of the internal combustion engine;
during a steady-state phase, introducing diesel fuel to the piston-cylinder unit as a pilot fuel injection before top dead center of an expansion phase of the piston-cylinder unit to initiate combustion of the gaseous fuel; and
responsive to operating in a transient phase, introducing the diesel fuel to the piston-cylinder unit as the pilot fuel injection and also as an expansion phase injection in the expansion phase of the piston-cylinder unit while heat is released from combustion of the gaseous fuel.

8. The method according to claim 7, further comprising, responsive to the operation in the transient phase, changing a position of a wastegate and/or a compressor bypass in a direction of a smaller opening.

9. The method according to claim 7, wherein the steady-state phase includes a current load demand changing by less than an absolute threshold value and the transient phase includes the current load demand changing beyond the absolute threshold value.

10. The internal combustion engine according to claim 1, wherein the regulating device in the pilot operating mode has a steady-state operating mode in which, in the expansion phase of the piston-cylinder unit, the piston-cylinder unit is not supplied with the expansion phase injection of diesel fuel by the fuel injector.

11. The internal combustion engine according to claim 1, wherein the regulating device, in the pilot operating mode, supplies gaseous fuel to the piston-cylinder unit from the gas supply device.

12. A system for a dual-fuel internal combustion engine, the system comprising:
a piston-cylinder unit;
a fuel injector for injecting a diesel fuel to the piston-cylinder unit;
a gas supply device for supplying gaseous fuel to the piston-cylinder unit; and
a regulating device configured to:
supply gaseous fuel to the piston-cylinder unit via the gas supply device;
during a steady-state phase, introduce diesel fuel to the piston-cylinder unit, via the fuel injector, as a pilot fuel injection before top dead center of an expansion phase of the piston-cylinder unit in order to initiate combustion of the gaseous fuel; and
responsive to operating in a transient phase, introduce the diesel fuel to the piston-cylinder unit, via the fuel injector, as the pilot fuel injection and also as an expansion phase injection in the expansion phase of the piston-cylinder unit while heat is released from the combustion of the gaseous fuel.

13. The system of claim 12, wherein the regulating device is configured to introduce the diesel fuel as the expansion phase injection by commanding diesel fuel injection via the fuel injector after top dead center of the expansion phase of the piston-cylinder unit.

14. The system of claim 12, wherein, during the steady-state phase, the piston-cylinder unit does not receive the expansion phase injection.

15. The system of claim 12, wherein the regulating device is further configured to, responsive to the operation in the transient phase, change a position of a wastegate and/or a compressor bypass in a direction of a smaller opening.

16. The system of claim 12, wherein the steady-state phase includes a current load demand changing by less than an absolute threshold value and the transient phase includes the current load demand changing beyond the absolute threshold value.

17. The system of claim 12, wherein the gas supply device comprises a port-injection valve.

18. The system of claim 12, wherein the gas supply device comprises a gas mixer positioned upstream of a compressor of a turbocharger.

* * * * *